(12) United States Patent
Ma (10) Patent No.: US 12,149,841 B2
(45) Date of Patent: Nov. 19, 2024

(54) SELECTIVELY MULTI-SAMPLED PIXEL ARRAY

(71) Applicant: Gigajot Technology, Inc., Pasadena, CA (US)

(72) Inventor: Jiaju Ma, Monrovia, CA (US)

(73) Assignee: Gigajot Technology, Inc., Pasadena, CA (US)

( * ) Notice: Subject to any disclaimer, the term of this patent is extended or adjusted under 35 U.S.C. 154(b) by 152 days.

(21) Appl. No.: 17/897,134

(22) Filed: Aug. 27, 2022

(65) Prior Publication Data

US 2023/0064463 A1 Mar. 2, 2023

Related U.S. Application Data (60) Provisional application No. 63/239,524, filed on Sep. 1, 2021.

(51) Int. Cl.
| | |
|---|---|
| H04N 25/50 | (2023.01) |
| H04N 25/40 | (2023.01) |
| H04N 25/53 | (2023.01) |
| H04N 25/59 | (2023.01) |
| H04N 25/616 | (2023.01) |
| H04N 25/65 | (2023.01) |
| H04N 25/709 | (2023.01) |
| H04N 25/766 | (2023.01) |
| H04N 25/77 | (2023.01) |
| H04N 25/78 | (2023.01) |
| H04N 25/618 | (2023.01) |

(52) U.S. Cl.
CPC ............ *H04N 25/50* (2023.01); *H04N 25/40* (2023.01); *H04N 25/53* (2023.01); *H04N 25/59* (2023.01); *H04N 25/616* (2023.01); *H04N 25/65* (2023.01); *H04N 25/709* (2023.01); *H04N 25/766* (2023.01); *H04N 25/77* (2023.01); *H04N 25/78* (2023.01); *H04N 25/618* (2023.01)

(58) Field of Classification Search
CPC .... H04N 25/616; H04N 25/709; H04N 25/50; H04N 25/77; H04N 25/78
See application file for complete search history.

(56) References Cited

U.S. PATENT DOCUMENTS

| 10,306,169 B2 | 5/2019 | Guidash et al. |
| 10,382,052 B2 | 8/2019 | Yeh et al. |

(Continued)

OTHER PUBLICATIONS

Yeh Shang-Fu et al, "A 0.66erms—Temporal-Readout-Noise 3-D-Stacked CMOS Image Sensor With Conditional Correlated Multiple Sampling Technique", IEE Journal of solid-state circuits, IEEE, USA, vol. 53, No. 2, dated Feb. 1, 2018, pp. 527-537.

(Continued)

*Primary Examiner* — David N Werner
(74) *Attorney, Agent, or Firm* — Robert C. Kowert; Kowert, Hood, Munyon, Rankin & Goetzel, P.C.

(57) ABSTRACT

Integrated-circuit imagers selectively multi-sample pixel array outputs according to luminance level indicated by an initial sample, avoiding the additional power/time required for multi-sampling in high-luminance, shot-noise-dominated conditions and, conversely, multi-sampling in readout-noise-dominated low-luminance conditions.

21 Claims, 3 Drawing Sheets

(56) References Cited

U.S. PATENT DOCUMENTS

| | | | |
|---|---|---|---|
| 2006/0203110 A1* | 9/2006 | Lim | H04N 25/616 348/E5.079 |
| 2014/0313385 A1* | 10/2014 | Sato | H03M 1/188 348/302 |
| 2015/0162929 A1 | 6/2015 | Shinozuka | |
| 2015/0264284 A1* | 9/2015 | Yoo | H04N 25/65 327/126 |
| 2015/0319393 A1* | 11/2015 | Sato | H04N 25/78 348/322 |
| 2016/0255293 A1 | 9/2016 | Gesset | |
| 2016/0301883 A1* | 10/2016 | Kim | H04N 25/65 |
| 2017/0126992 A1* | 5/2017 | Yao | H04N 25/53 |
| 2017/0208276 A1* | 7/2017 | Sun | H01L 27/14643 |
| 2018/0198996 A1* | 7/2018 | Ha | H04N 25/76 |
| 2019/0098234 A1* | 3/2019 | Lee | H04N 25/616 |
| 2020/0260027 A1* | 8/2020 | Cho | H04N 25/75 |
| 2021/0314510 A1 | 10/2021 | Powell | |
| 2022/0078362 A1* | 3/2022 | Jung | H04N 25/75 |
| 2022/0159206 A1* | 5/2022 | Gao | H04N 25/75 |
| 2022/0394203 A1* | 12/2022 | Matsuura | H04N 25/75 |
| 2023/0053956 A1* | 2/2023 | Oh | H04N 25/65 |

OTHER PUBLICATIONS

International search report and written opinion from PCT/US2022/041776, dated Dec. 9, 20222, pp. 1-16.

* cited by examiner

FIG. 4 Dual-Slope ADC

FIG. 3

FIG. 5
*ramp-direction normalizer*

FIG. 6
*Dual-Slope ADC*

SELECTIVELY MULTI-SAMPLED PIXEL ARRAY

CROSS-REFERENCE TO RELATED APPLICATIONS

This application hereby claims priority to and incorporates by reference U.S. provisional application No. 63/239,524 filed Sep. 1, 2021.

TECHNICAL FIELD

The disclosure herein relates to high performance imaging integrated circuits (ICs).

DRAWINGS

The various embodiments disclosed herein are illustrated by way of example, and not by way of limitation, in the figures of the accompanying drawings and in which like reference numerals refer to similar elements and in which.

DETAILED DESCRIPTION

In various embodiments herein, integrated-circuit imagers selectively multi-sample pixel array outputs according to luminance level indicated by an initial sample, avoiding the additional power/time required for multi-sampling in high-luminance, shot-noise-dominated conditions and, conversely, multi-sampling in readout-noise-dominated low-luminance conditions. In a number of embodiments, a full-range initial sample and one or more conditional fractional-range samples are executed by single-slope analog-to-digital converter (SSADC) that generates corresponding full-range and provisory fractional-range reference ramps (ramp signals compared with pixel output to ascertain digital value corresponding to point of signal crossover or equality) with the latter requiring a relatively shorter minimum-to-maximum ramp time (i.e., by virtue of lower max-level luminance and thus fractional/compressed/compacted range) so that total pixel readout time, from first sample to last, is reduced for all luminance levels (i.e., as compared to unconditional execution of multiple full-range ramps).

In the various selective-multi-sampling embodiments presented herein, the pixel reset level—effected by resetting a capacitive floating diffusion node coupled to the gate of a source-follower output transistor—is itself multi-sampled in a sequence of fractional-range (reset-range) sampling operations followed by intra-pixel charge transfer (e.g., from photodetection element to floating diffusion node) and then the full-range and conditional fractional-range (low-luminance-range) sampling operations. Accordingly, all low-amplitude pixel output signals, including reset-level outputs and low-luminance signal-level outputs (i.e., "signal-level output" referring pixel output after photocharge transfer from photodetector to floating diffusion node) are multi-sampled to reduce readout circuit noise (collectively, 1/f noise, thermal noise, etc.), whereas the additional power/delay of image-level multi-sampling is avoided in higher luminance conditions where photon shot noise dominates. In a number of embodiments, correlated multi-sampled (CMS) pixel values are finalized in the digital domain as the difference between either (i) the single full-range sample and averaged reset-range samples where the full-range sample indicates a luminance level beyond a predetermined (or adaptively-generated or programmed) luminance threshold, or (ii) averaged low-luminance-range samples (optionally including the full-range sample) and averaged reset-range samples where the full-range sample indicates an under-threshold luminance level. In other implementations, the multiple reset-level samples may be averaged in the analog domain and then digitized prior to subtraction with respect to digitized full-range or averaged low-luminance-range samples (i.e., averaged reset samples serving as minuend or subtrahend), or even analog-domain subtracted with respect to analog full-range or analog-averaged low-luminance-range samples. Total pixel-output sampling time is further reduced in other CMS image sensor embodiments through dual-slope analog-to-digital conversion—digitizing a given pixel output signal successively (multi-sampling) in response to alternating rising and falling reference-ramp polarities, thus avoiding the time delay otherwise required for reference-ramp reset (i.e., resetting ramp generator output from ending level to starting level following each of multiple single-slope analog-to-digital conversions). Normalization circuitry may be provided in various dual-slope ADC embodiments to cancel slope-polarity-dependent offsets in sampled pixel values. These and other features and embodiments are described in further detail below.

Figure 1:
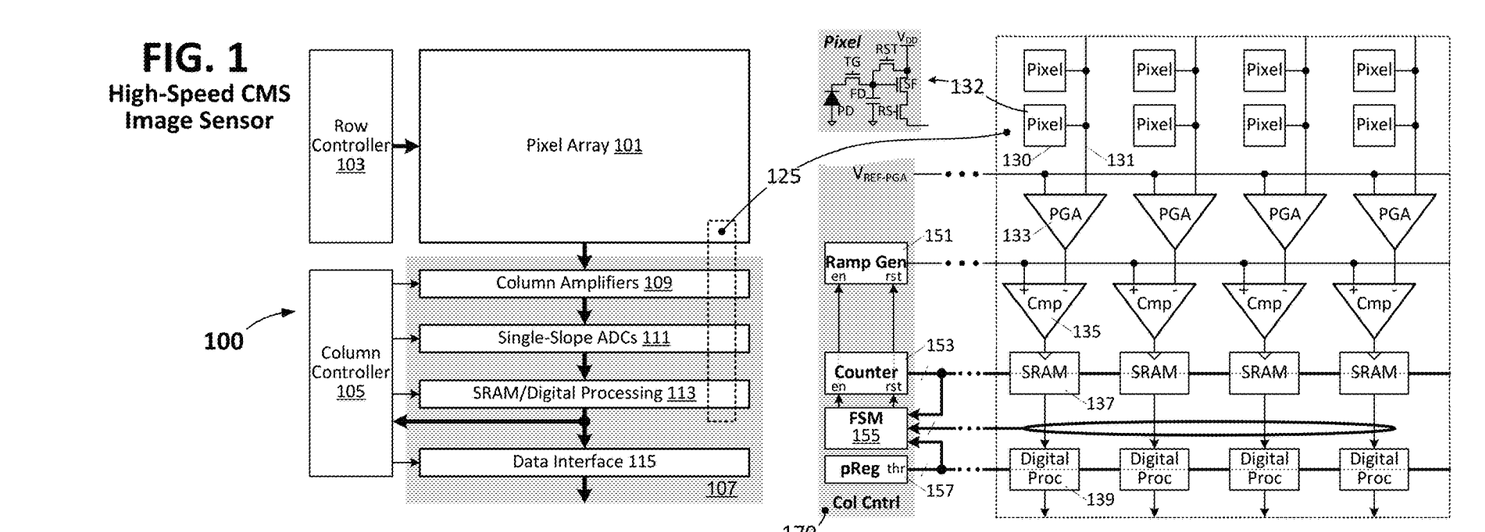
FIG. 1 illustrates an embodiment of a luminance-driven correlated multi-sampling (CMS) integrated-circuit image sensor.

FIG. 1 illustrates an embodiment of a high-speed CMS imaging IC 100 having a pixel array 101, row control circuitry 103, column control circuitry 105 and column readout circuitry 107, the latter implemented at least in part by a bank of column amplifiers 109, single-slope ADC circuits 111 (SSADCs), digital processing block 113 (e.g., including a static random access memory (SRAM) data store), and data interface 115. Referring to an exemplary four-column slice of image sensor 100 shown at 125—spanning from a lower portion of pixel array 101 through column amplifiers 109, SSADCs 111, and SRAM/digital processing block 113—following each exposure interval (or image frame), individual pixels 130 within each column of pixel array 101 are selected in a row-wise sequence (e.g., row-scan) to drive a corresponding column output line 131 over a respective row readout interval, with the rows of pixels being selected one after another to effect a rolling-shutter row-readout (i.e., all pixels in a given row enabled by row controller to drive their respective column output lines concurrently during a respective row readout interval). In the FIG. 1 example, individual pixels 130 within row/column array 101 are implemented by four-transistor (4T) active pixels each having a photodiode (PD), transfer gate (TG), floating diffusion node (FD), source follower transistor (SF), read-select transistor (RS) and reset transistor (RST) as shown at 132. At the start of a row-readout interval (row interval) for a selected row of pixels, row controller 103 asserts a row-select signal to switch on the read-select transistors within all constituent pixels of the selected row and thereby conductively couple, within each individual pixel 130, the source terminal of the source follower transistor to column output line 131. The column output line is biased by a steady-state bias current (e.g., generated by biasing circuitry within the column readout block, not specifically shown) to effect a nominally fixed gate-to-source voltage within each of the source-follower transistors of the selected row of pixels such that changes in the source-follower gate voltage (i.e., the floating-diffusion voltage) yield proportional voltage changes at the source-follower source terminal (i.e., the SF source voltage "follows" the SF gate voltage) and thus respective voltage-mode signals on column output lines 131 that change in proportion to the voltage on the in-pixel floating diffusion nodes of the subject pixels. In the FIG. 1 example, the pixel output signals driven onto respective column lines 131 (i.e., by constituent pixels 130 of a read-select-enabled pixel-row) are amplified within programmable gain amplifiers 133(collectively forming a PGA bank) to yield amplified pixels signals that are digitized within downstream circuitry. More specifically, a bank of per-column comparators 135 and SRAM latch circuits 137 (per-column components of SSADC 111) cooperate to latch respective count values corresponding to voltage levels of the amplified pixel signals—the comparators 135 comparing each PGA output (amplified pixel output signal) with the output of a voltage-ramp generator 151 (i.e., within column controller 105) and generating, in response, a comparator output that transitions at the point of voltage level cross-over (e.g., when the voltage ramp from generator 151 rises above the pixel output level in the case of a rising-slope voltage ramp), and the SRAM latch elements 137 latching a corresponding count value (sequenced by a counter 153) in response to the comparator output transition. Thus, in the case of a linear rising-slope voltage ramp and corresponding linear count sequence, the SRAM latch 137 for each pixel output column will capture—as a digitized sample of the amplified pixel output signal—a count value corresponding to the ramp voltage level at the point of cross-over with respect to the amplified pixel output signal.

In a generalized readout sequence, the floating-diffusion node (FD) within each pixel of a selected row is precharged to a reset voltage level (i.e., row controller briefly switching on reset transistor to precharge the floating diffusion to $V_{DD}$ or other reset voltage) before transitioning, in response to photocharge transfer, to a "signal-level" voltage (i.e., row controller briefly switching on transfer gate to enable photocharge accumulated within photodiode/photodetector during preceding exposure interval to be conductively transferred to the floating diffusion node). To cancel kTC noise incurred in the floating-diffusion reset operation, pixel output signals corresponding to both the reset-level and the signal-level of the floating diffusion (i.e., the reset-level and signal-level pixel outputs, respectively) are captured within the column-readout circuitry and differenced (one subtracted from the other) to yield a correlated double-sampled (CDS) readout. Accordingly, when executed in the digital domain, CDS readout requires two digital sampling operations (two ADC operations) per pixel readout and thus two voltage ramps per pixel readout in the FIG. 1 SSADC—one for the reset-level output and another for the signal-level output. Where multiple digital samples of reset-level output and the signal-level output are captured and averaged to reduce readout circuit noise—that is, correlated multi-sampling (CMS) that nominally reduces low-luminance readout noise (i.e., 1/F noise, thermal noise, source-follower noise, etc.) by $1/\sqrt{N}$, where the multi-sampling factor 'N' is the number of samples of a given pixel output signal level—the SSADC voltage-ramp count is multiplied by the multi-sampling factor, expanding the per-row readout time (and overall array scan time) accordingly and thereby lowering the peak frame rate of the image sensor.

Leveraging the observation that the predominant high-luminance noise source (photon shot noise induced by randomness of photon arrival) is impervious to reduction through multi-sample averaging, CMS image sensor 100 samples signal-level pixel outputs in a solitary full-range SSADC operation, continuing to obtain additional signal-level samples only where the initial full-range sample indicates below-threshold luminance (e.g., below a luminance threshold at which multi-sample averaging provides appreciable noise reduction) and, in that case, with one or more relatively brief SSADC ramps that quantize only the under-threshold output range (with some added tolerance). FIG. 1 illustrates an example of this strategic sampling arrangement at 170, multi-sampling the reset-level output at 171 with a fractional reset-range SSADC ramp (repeated N times) that spans the nominal reset-level output plus a statistical tolerance (e.g., predetermined or programmable number of standard deviations above nominal reset-level output) and then, after charge transfer, mono-sampling the full-range signal-level output at 173 (SSADC ramp extending from zero-reference to peak/maximum ramp level), and then, where all signal-level outputs within the subject pixel row fall below the luminance threshold (174), obtaining one or more additional low-range signal-level samples at 175 with respective fractional low-luminance-range SSADC ramps that span the under-threshold luminance range plus a tolerance.

In the FIG. 1 embodiment, conditional signal-level multi-sampling (with tri-level ramping for the reset-range, peak-range and low-luminance-range sampling) is managed by a finite state machine or other control circuitry implemented within column controller 105. In expanded view 125, for example, a finite state machine (FSM) 155 receives the full-range SSADC samples from SRAM latches 137 and a pre-programmed digital luminance threshold and optional tolerance value from programmable register 157 to enable distinction between high and low luminance conditions. If all the full-range SSADC samples for the subject pixel row fall below the luminance threshold, the FSM issues a sequence of reset and enable signals ("rst," "en") to cycle the ramp generator and counter through one or more additional low-luminance (fractional) SSADC ramps. In one embodiment, for example, the FSM asserts the reset signal following completion of the full-range ramp, resetting the ramp generator and the counter to a baseline (e.g., zero) level, and then asserts the enable signal to enable ramp generator 151 and counter 153 to concurrently generate a ramped voltage output and incrementing count value, respectively (e.g., the counter being clocked by a clock signal, not specifically shown), the latter being supplied to both SRAM latch elements 137 and 155. Upon detecting a count output from counter 153 corresponding to the maximum count for the low-luminance quantization range (e.g., the low-luminance maximum count being programmed within register 157 and output therefrom to FSM 155), the FSM lowers the enable signal to conclude the low-luminance SSADC operation, optionally resetting and repeating the low-luminance SSADC control sequence a number of additional times according to a predetermined or programmed multi-sampling factor. Referring to the tri-level SSADC ramp generation at 170, as each of the conditionally-executed low-luminance SSADC ramps terminates well below the peak of the full-range ramp, signal-level sampling is implemented over a substantially shorter time interval than conventional full-ramp multi-sampling—either skipping the signal-level multi-sampling entirely where the initial mono-sampled full-ramp SSADC indicates over-threshold luminance, or compacting the signal-level multi-sampling into a substantially shorter interval by virtue of the lowered low-luminance ramp termination point.

Figure 2:
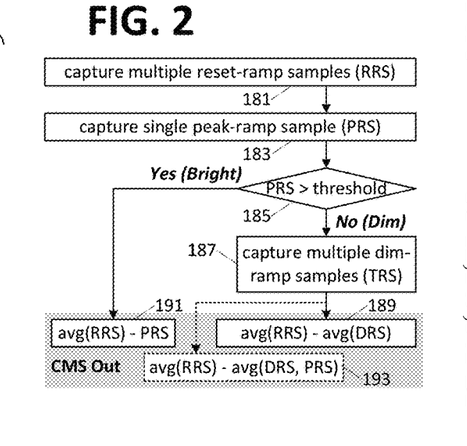
FIG. 2 illustrates an exemplary pixel readout flow implemented by the row and column controllers of FIG. 1.

FIG. 2 illustrates an exemplary pixel readout flow implemented by the FIG. 1 row and column controllers. At 181, the reset-level pixel output is multi-sampled (multiple reset-range SSADC ramps) to yield multiple digitized reset-ramp samples (RRS). A short time thereafter (sufficient for the row controller to complete a charge transfer operation, transferring accumulated photocharge from photodetector to floating diffusion node within each pixel of the selected pixel-row), a peak-ramp (full-ramp) signal-state sample (PRS) is captured at 183 and then compared against a programmed or otherwise predetermined luminance threshold at 185. If all the peak-rate samples for the subject pixel row fall below the threshold (i.e., relatively low-luminance and/or dim pixel outputs and thus negative determination at 185), multiple additional samples of the signal-level output are captured in fractional-ramp SSADC operations at 187—below-peak SSADC ramp termination yielding multiple truncated-ramp or "dim-ramp" samples (DRS)—with the average of those DRS samples being subtracted from an average of the reset-ramp samples (or vice-versa) within the per-column digital processing element of the column readout path (i.e., 139 of FIG. 1) to yield a low-latency CMS output (189). If one or more of the peak-rate samples for the subject pixel row exceed the low-luminance threshold (i.e., higher luminance, brighter light signal-level outputs in which photon shot noise is the dominant noise component), the per-column processing block (139 of FIG. 1) may generate the CMS output without signal-level multi-sampling (omitting/refraining from executing the dim-ramp sampling operations) by subtracting the single peak-ramp sample (PRS) from the averaged reset-ramp multi-samples (or vice-versa) as shown at 191.

Reflecting on the FIG. 2 readout sequence, low-luminance signal-level multi-sampling in some rows (i.e., where peak-ramp samples fall below luminance threshold) and not others may yield row-to-row readout-time variation and, as photocharge accumulation for a given image frame generally continues up until photocharge transfer, slight but corresponding row-to-row exposure time variance. Moreover variations in row-by-row exposure may be cumulative across the pixel array where row readouts are sequenced linearly (e.g., from top of pixel array to bottom or vice-versa) and more generally undesirable in some imaging applications. Accordingly, in the FIG. 1 embodiment (and others discussed below), FSM 155 responds to a programmable levelized-readout setting (e.g., programmed within register 157 of FIG. 1), by imposing a levelizing time delay corresponding to the low-luminance signal-level multi-sampling time before concluding the row-readout interval—an approach that yields uniform row-to-row readout times (the levelizing time interval either consumed by low-luminance multi-sampling, or constituting an idle time) while retaining the power-saving benefit of conditional low-luminance multi-sampling.

In an alternative high-speed CMS image sensor embodiment or configuration, the FIG. 1 FSM 155 bypasses (skips, refrains from executing) signal-level multi-sampling only where all PRS samples for the selected pixel row exceed the luminance threshold (not just any one of those PRS samples as in the embodiment discussed above), thus ensuring noise-mitigating signal-level multi-sampling for any low-luminance signal-level outputs (i.e., where one or more pixels of the row yield over-threshold signal-level outputs and one or more others yield under-threshold signal-level outputs). In such embodiments, the digital processing block may generate a per-pixel CMS output either as shown at 191 of FIG. 2 (difference between average RRS samples and solitary PRS sample) or at 189 (difference between average RRS samples and average DRS samples) according to whether the PRS sample for that pixel column exceeds or does not exceed the luminance threshold. In a number of embodiments, particularly where the FIG. 1 SRAM elements are implemented by per-column counter elements (i.e., column controller 105 outputs a clock to increment per-column counters rather than a count value from a shared counter), the per-column digital processing blocks (139) may output respective count-enable signals to either enable or suppress/disable dim-ramp counting operations within the per-column counters according to whether the peak-ramp sample for that pixel column exceeds or does not exceed the luminance threshold (i.e., avoiding counter power consumption required to multi-sample any above-luminance-threshold signal-level outputs). In all cases, the peak-ramp sample (PRS) may be averaged together with low-luminance signal-level samples as shown at 193 in FIG. 2—constituting one of the signal-level multi-samples—so that the signal-level multi-sampling factor is given by the number fractional-ramp low-luminance samples plus one.

Figure 3:
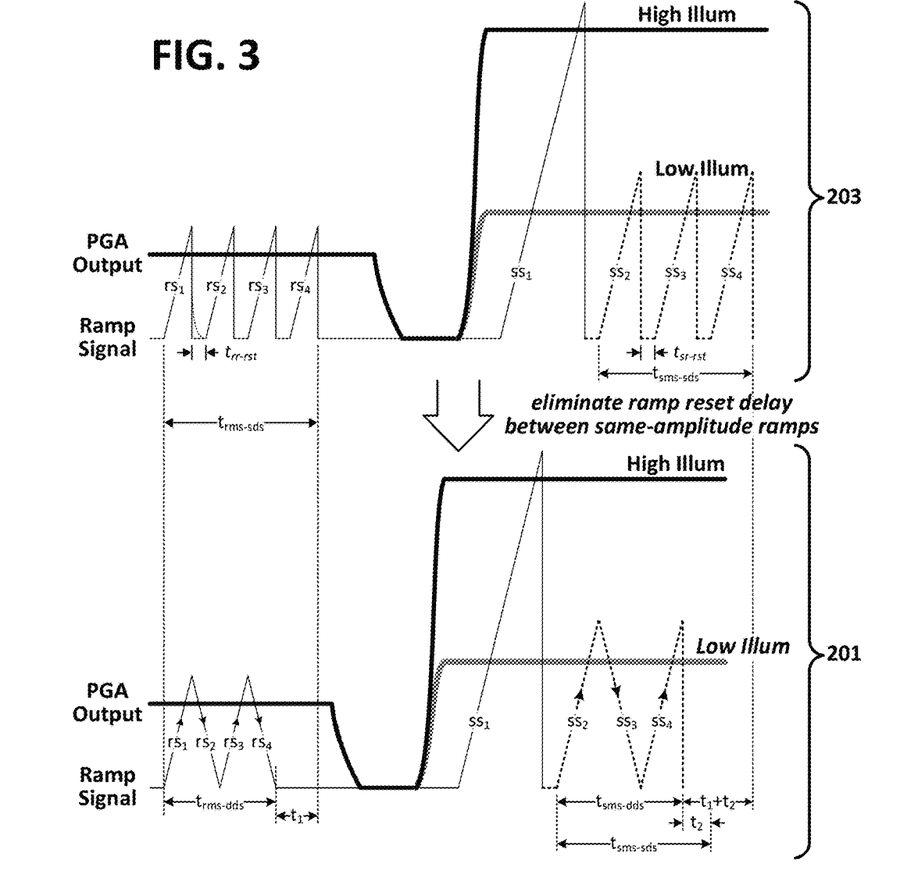
FIG. 3 illustrates an alternative correlated multi-sampling sequence in which one or both of the reset-level and signal-level pixel outputs are multi-sampled in response to successive rising-slope and falling-slope voltage ramps, eliminating the ramp-reset delay.

FIG. 3 illustrates an alternative correlated multi-sampling sequence in which one or both of the reset-level and signal-level pixel outputs are multi-sampled in response to successive rising-slope and falling-slope voltage ramps, eliminating the ramp-reset delay imposed between successive SSADC sampling operations—thereby further shortening the per-row CMS readout interval and enabling correspondingly higher image frame rates. In the depicted "dual-slope" ADC example at 201, the reset-level output is 4× multi-sampled (i.e., capturing four digital samples rs1, rs2, rs3, rs4) in response to four alternating-polarity ADC ramps (rising-slope, falling-slope, rising-slope and then falling-slope), eliminating the reset-ramp turnaround time required by a conventional SSADC (i.e., $t_{rr\text{-}rst}$ as shown for comparison in the single-slope ADC approach at 203) and correspondingly shortening the reset-level sampling time by $t_{rms\text{-}ssd} - t_{rms\text{-}dsd} = t_1 = (N_1 - 1) * t_{rr\text{-}rst}$, where $t_{rms\text{-}ssd}$ and $t_{rms\text{-}dsd}$ are the cumulative time intervals for reset-level multi-sampling with single and dual slope directions, respectively, and $N_1$ is the reset-level oversampling factor.

Low-luminance multi-sampling (i.e., when peak-ramp sample below luminance threshold), is likewise implemented by alternating (dual) polarity low-luminance ADC ramps—in this case successive rising-slope, falling-slope and then rising-slope ramps yielding signal-level samples ss2, ss3 and ss4 over dual-direction sampling interval $t_{sms\text{-}dds}$—to eliminate the low-luminance ramp reset time ($t_{sr\text{-}rst}$) and thus shorten the signal-level multisampling interval by $t_{sms\text{-}ssd} - t_{sms\text{-}dsd} = t_2 = (N_2 - 2) * t_{sr\text{-}rst}$, where $t_{sms\text{-}ssd}$ is the cumulative sampling time interval for low-luminance single-slope multi-sampling (203), and $N_2$ is the signal-level multi-sampling factor (including the peak-ramp sampling operation). Thus, dual-slope ADC operation reduces net low-luminance CMS readout time by $t_1+t_2=(N_1-1)*t_{rr\text{-}rst}+(N_2-2)*t_{sr\text{-}rst}$ relative to that required for a single-polarity ADC ramp (i.e., requiring sample-to-sample ramp reset)—a time savings that may enable correspondingly higher frame rate or, alternatively, increased multi-sampling factor for the reset-level and/or signal-level pixel outputs.

Figure 4:
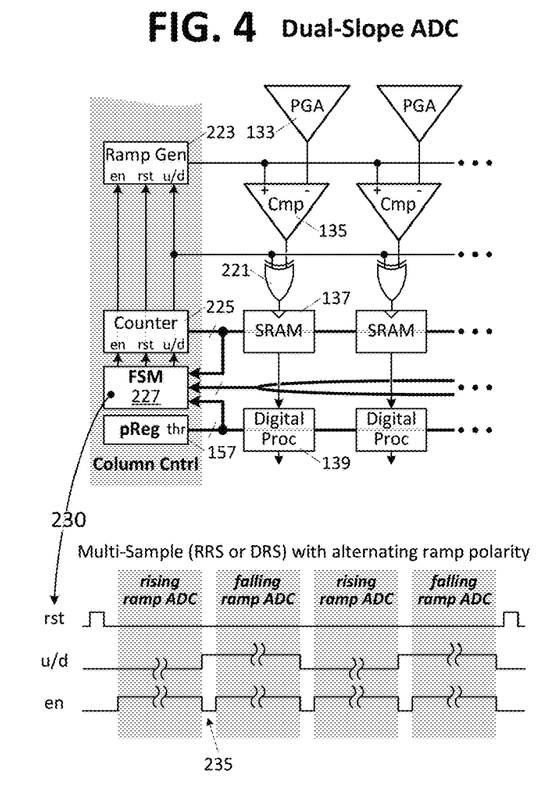
FIG. 4 illustrates an exemplary excerpt of the column control circuitry and per-pixel readout circuitry within an embodiment of the FIG. 1 CMS image sensor revised to implement dual-slope analog-to-digital (A/D) conversion.

FIG. 4 illustrates an exemplary excerpt of the column control circuitry and per-pixel readout circuitry within an embodiment of the FIG. 1 CMS image sensor revised to implement dual-slope A/D conversion (DSADC). The per-column readout circuitry includes the PGA 133, comparator 135, SRAM latch 137 and digital processing components 139 discussed above, together with a bank of logic gates 221 disposed between the comparators and SRAM latches to selectively invert the comparator output according to ADC ramp polarity—enabling generation of a rising edge (or falling-edge) latch signal at the SRAM latch-enable inputs regardless of ramp polarity. Within the column controller, ramp generator 223, counter 225 and FSM 227 are revised to provide for dual-polarity ramp generation (rising slope and falling slope), dual-polarity counting (up and down), and up/down control over the ramp and count polarities. Referring to the control signal sequence in detail view 230, for example, instead of resetting the ramp generator and counter following each sampling ramp, FSM 227 resets those components only once at the beginning of each multi-sampling operation (i.e., for the reset-level pixel output and then again for the conditional signal-level output) and thereafter toggles an up/down control signal at the conclusion of each rising-slope or falling-slope A/D conversion to effect reset-free dual-slope (dual-polarity) multi-sampling. To effect 4x multi-sampling, for instance, FSM 227 initially lowers the up/down signal ('u/d') and then asserts the enable signal ('en') to commence both rising/positive-slope ramp generation within ramp generator 223 and rising/positive-increment counting within counter 225. When the count value reaches the terminal count for the subject pixel output (e.g., reset-ramp maximum in the case of a reset-level pixel output, or low-luminance maximum in the case of a signal-level output—both or either of which may be specified by fields within programmable register 157), the FSM toggles the up/down output (e.g., initially from low to high as shown at 231) optionally lowering the enable signal briefly while the up/down transition propagates through the ramp generator and counter circuitry (i.e., briefly suspending count-increment or ramp ascendence/descendance during enable signal deassertion at 235). In any case, concurrent assertion of the enable signal and countdown state of the up/down signal (e.g., logic high up/down signal in the example at 230) triggers generation of a falling/negative-slope ramp within ramp generator 223 and a descending (progressively decremented) count output from counter 225. As shown, the up/down signal is also supplied to the bank of exclusive-OR gates 221, inverting the comparator output levels (e.g., from all high following reset level digitization as the reset ramp rises above the reset-level output for all pixel columns) so that as the negative-slope voltage ramp falls below the reset-level outputs, the XOR-inverted comparator outputs trigger capture of the corresponding count value within the SRAM latch elements (e.g., if SRAM latches are triggered by low-to-high transition at their load-enable inputs, the exclusive-OR inversion will ensure the requisite low-to-high transition at the ramp cross-over point for both rising and falling ramp polarities).

Figure 5:
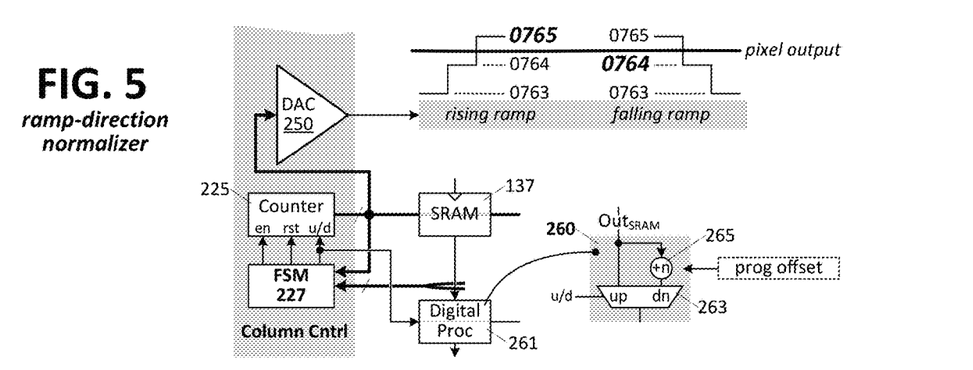
FIG. 5 illustrates a digital-to-analog converter (DAC) implementation of the ramp generator shown in FIG. 4, the DAC converting a linear count output into a stair-step voltage ramp.

In a number of embodiments, ramp generator 223 of FIG. 4 is implemented by a digital-to-analog converter (DAC) that converts a linear count output (e.g., count output from counter 225) into a stair-step ramp. FIG. 5 illustrates such an embodiment, showing DAC 250 together with exemplary rising-slope and falling-slope cross-over points effected by the counter-stepped voltage ramp (i.e., DAC output). In a zero-hysteresis ramp comparator (e.g., component 135 FIG. 4, present but not specifically shown in FIG. 5), the counter-stepped ramp yields a one-bit quantization disparity between the rising-slope and falling-slope samples, capturing the count value corresponding to the cross-above ramp voltage on the rising-slope (positive polarity) ramp and the lesser count value corresponding to the cross-below ramp voltage on the falling-slope (negative polarity) ramp—systemically generating disparate ramp-polarity-dependent ADC results (e.g., 765 and 764 in the FIG. 5 example) of the same signal. In one embodiment, this polarity-dependent quantization disparity is eliminated by a normalizing circuit 260 within per-column digital processing element 261—the normalizing circuit implemented, for example, by a multiplexer 263 that passes (to downstream circuitry) either the unmodified ADC result or an incremented ADC result (generated by incrementing circuit 265, where '+n' refers to '+1' in this example) according to the up/down signal from FSM 227 and thus according to whether the subject ADC result was generated in response to a positive-polarity or negative-polarity ramp, respectively. In alternative embodiments, normalizing circuit 260 may additionally compensate for systemic comparator hysteresis or any other systemic polarity-dependent ADC disparity (e.g., adding/subtracting a generalized value 'n' from a given-polarity sample). Further, one or more steady-state calibration signals may be sampled with alternating ramp polarities within the dual-slop ADC to calibrate polarity-dependent ADC disparity on a per-column basis (e.g., storing a polarity-dependent compensation value 'n' to be added to/removed from the ADC result for a given polarity).

Figure 6:
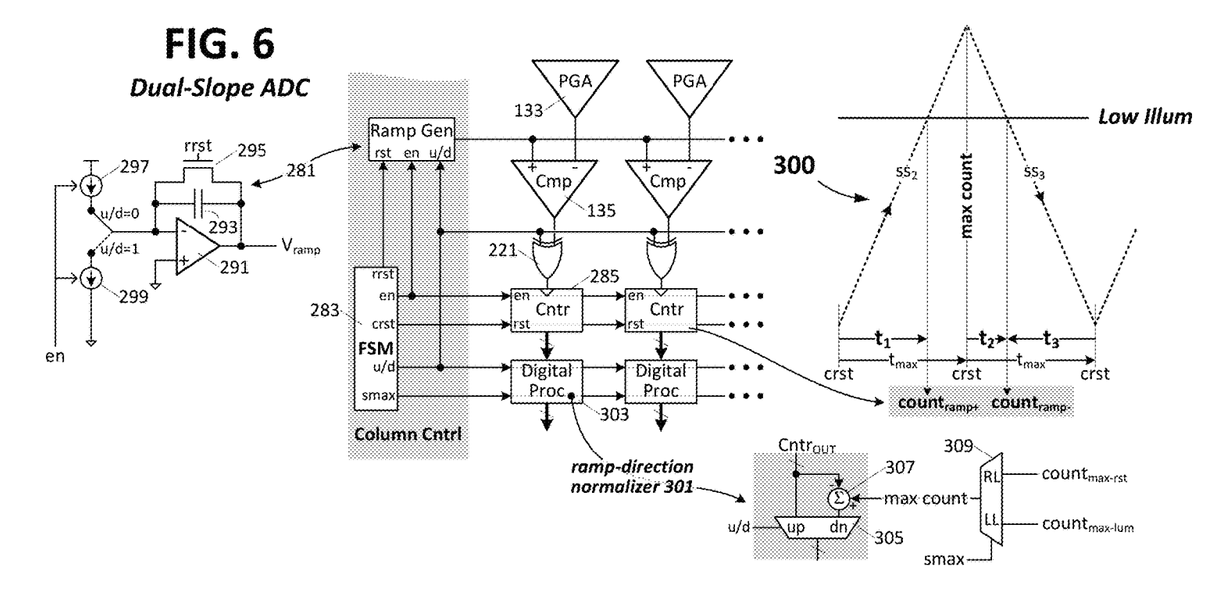
FIG. 6 illustrates exemplary linear ramp generator, finite state machine and per-pixel readout circuit embodiments that implement a linear dual-slope voltage ramp and provide for per-column count generation.

FIG. 6 illustrates exemplary linear ramp generator 281, finite state machine 283 and per-pixel readout circuit embodiments that implement a linear dual-slope voltage ramp and provide for per-column count generation (i.e., global counter and SRAM latch elements in embodiments discussed above replaced by clocked per-column counter elements 285—clock signal not specifically shown). In the depicted example, the linear ramp generator 281 is implemented by an integrator (e.g., operational amplifier 291 with capacitive element 293 coupled in negative feedback path), ramp-reset transistor 295 (to zero the voltage across integration capacitor 293 and thus the ramp output in response to a ramp-reset signal 'rrst' from FSM 283), and charging and discharging current sources 297 and 299 (e.g., implemented by matched current mirror circuits), the latter enabled by FSM 283 (e.g., in response to assertion of enable signal 'en') and alternately coupled to deliver current to feedback capacitor 293 according to the state of the up/down signal ('u/d') from FSM 283. Accordingly, when FSM 283 outputs a positive-polarity up/down signal—u/d=0 in this example—and also asserts the ramp enable signal ('en'), current source 297 delivers current to the terminal of integration capacitor 293 coupled to the inverting input of operational amplifier 291, triggering a countervailing current delivery from the operational amplifier to the output-coupled terminal of the integration capacitor (i.e., to zero the voltage between the op-amp inputs by virtue of the negative-feedback disposition of capacitor 293, and thus drive/maintain the voltage at the inverting op-amp input at the ground potential of the non-inverting op-amp input) and thus a linearly rising voltage, $V_{ramp}$, at the op-amp output. Conversely, when FSM 283 outputs a negative-polarity up/down signal (and ramp-enable signal) to engage current source 299, the operational amplifier performs the opposite operation, drawing down $V_{ramp}$ in a linear profile to match the current draw from current source 299.

In the FIG. 6 embodiment, per-column counters 285 are reset at the commencement of each voltage ramp, regardless of polarity and thereafter generate an incrementally ascending count (or alternatively a down-count), stopping and thus latching an ADC result when output of comparator 135 transitions (a transition propagating through and selectively being inverted by exclusive OR gate 221 as discussed above), signaling that the cross-over point with respect to the pixel output signal (reset-level or signal-level output) has been reached. Accordingly, successive ADC results captured in response to positive-polarity and negative-polarity ramps measure the time for the voltage ramp to ascend or descend to the cross-over voltage from disparate starting potentials— from the reset-level potential in the case of the positive-polarity ramp, and from the maximum ramp potential (maximum low-luminance ramp level or maximum reset ramp level) in the case of a negative-polarity ramp. As can be seen in the graphical example at 300, the resulting positive- and negative-polarity count values ($count_{ramp+}$ and $count_{ramp-}$) and corresponding counting intervals (t1, t2) are complementary components of the maximum count value ("max count") and total ramp time ($t_{max}$), respectively. Accordingly, ADC results generated by sampling with respect to disparate-polarity ramps may be normalized by choosing the ADC result corresponding to one ramp polarity as the baseline and normalizing the other "offset" ADC result to that baseline by subtracting the offset ADC result from the maximum count. In the FIG. 6 implementation, for instance, a ramp-direction normalizer circuit 301 (e.g., implemented within per-column digital processing block 303) responds to an FSM up/down output ('u/d') indicating a negative polarity ramp by selecting (via multiplexer 305) a max-count normalized instance of the captured count value ($Cntr_{OUT}$)—the normalized instance generated by subtracting the count value from the appropriate maximum count within circuit 307. As shown, the maximum count value itself may delivered via multiplexer 309 in response to a max-select signal ("smax") from FSM 283 according to the pixel output signal being multi-sampled (e.g., reset-level output or low-luminance signal-level output). As with ramp parameterizing values, the maximum count values for various ramps (including the full-range mono-sampling ramp) may be stored within a programmable register (e.g., register 157 of FIG. 1) and applied for normalization purposes and to control ramp generation times. In the FIG. 6 embodiment, for example, FSM 283 may itself include a counter that counts up to programmed/predetermined maximum counts corresponding to various ramp levels (e.g., the tri-level ADC ramps shown in FIG. 1) and thus used to control timing of ramp and counter enable signals (and ramp and counter reset signals, rrst and crst). In other embodiments, per-column counters 285 may be implemented with dual-direction counting circuitry, being reset to zero in preparation for counting up to an ADC result during positive-polarity $v_{ramp}$ generation and reset to max count in preparation for counting down to an ADC result during negative-polarity $v_{ramp}$ generation, potentially obviating or at least simplifying the ramp-direction normalization circuitry. More generally, any practicable counter and ramp circuitry capable of generating dual-polarity ADC results with or without output normalization circuitry may be deployed within the various high-speed CMS imaging ICs presented herein.

The various CMS imager embodiments, operating methodology, implementing circuitry, etc. disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit, layout, and architectural expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits and device architectures can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply details not required to practice those embodiments. For example, any specific signal polarities, photodetector implementations, transistor types (e.g., n-type vs p-type, field-effect vs. bipolar junction, etc.), time intervals and the like can be different from those described above in alternative embodiments. In particular, while pixel output signals generated by programmable gain amplifiers are shown as having a positive correlation to pixel illumination (e.g., PGA 133 inverting the negatively-luminance-correlated output of the n-type 4T pixel shown at 132 in FIG. 1), the opposite may be true, with corresponding changes in equality determinations (e.g., outputs of comparators) and digital processing operations. Operations described as being performed in the digital domain may be performed instead in whole or part in the analog domain and vice-versa. Signal paths depicted or described as individual signal lines may instead be implemented by multi-conductor signal buses and vice-versa and may include multiple conductors per conveyed signal (e.g., differential or pseudo-differential signaling). The term "coupled" is used herein to express a direct connection as well as a connection through one or more intervening functional components or structures. Programming of operational parameters (delay intervals, max counts, luminance thresholds, multi-sampling factors, normalization values, clock frequencies, etc.) or any other configurable parameters may be achieved, for example and without limitation, by loading a control value into a register or other storage circuit within the above-described imager IC in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An imaging integrated-circuit (IC), comprising:
a pixel having a photodetection element, floating diffusion node and output circuitry coupled to the floating diffusion node; and
control circuitry to:
reset the floating diffusion node to generate, via the output circuitry, a first pixel output;
generate a plurality of first digital samples of the first pixel output by comparing the first pixel output with a sequence of first voltage ramps that each span a first voltage range;
transfer photocharge from the photodetection element to the floating diffusion node to generate, via the output circuitry, a second pixel output;
generate a second digital sample of the second pixel output by comparing the second pixel output with a second voltage ramp that spans a second voltage range, the second voltage range exceeding the first voltage range; and
if a first condition is met, generate a plurality of third digital samples of the second pixel output by comparing the second pixel output with a sequence of third voltage ramps that each span a third voltage range that exceeds the first voltage range and is smaller than the second voltage range, the first condition requiring at least that the second digital sample not exceed a threshold value.

2. The imaging IC of claim 1 wherein the second digital sample is a full-range sample of the floating diffusion node.

3. The imaging IC of claim 1 further comprising circuitry to generate a digital pixel value according to a difference between the second sample and an average of the plurality of first digital samples if the second digital sample exceeds the threshold value.

4. The imaging IC of claim 1 further comprising circuitry to generate a digital pixel value according to a difference between an average of the plurality of third digital samples and an average of the plurality of first digital samples if the first condition is met.

5. The imaging IC of claim 1 further comprising circuitry to generate, if the first condition is met, a digital pixel value according to a difference between an average of the plurality of first digital samples and an average of a plurality of digital samples that includes both the second digital sample and the plurality of third digital samples.

6. The imaging IC of claim 1,
wherein the pixel is disposed within a row of a pixel array of the imaging IC, the row having a plurality of other pixels, and
wherein the first condition additionally requires that respective digital samples of pixel outputs from the plurality of other pixels not exceed the threshold value.

7. The imaging IC of claim 1 wherein:
the pixel includes a transfer gate disposed between the photodetection element and the floating diffusion node;
the photocharge is accumulated within the photodetection element of the pixel over an exposure interval; and
the control circuitry to transfer the photocharge from the photodetection element to the floating diffusion node comprises circuitry to switch on the transfer gate upon conclusion of the exposure interval to enable conduction of the photocharge from the photodetection element to the floating diffusion node.

8. The imaging IC of claim 1 wherein the first, second and third voltage ranges each span from a first reference voltage to respective first, second and third maximum ramp voltages, the second maximum ramp voltage exceeds the first and third maximum ramp voltages.

9. The imaging IC of claim 1 wherein the sequence of first voltage ramps comprises successive voltage ramps that span the first voltage range with alternating slope polarity.

10. The imaging IC of claim 9 wherein the sequence of third voltage ramps comprises successive voltage ramps that span the third voltage range with alternating slope polarity.

11. A method of operation within an imaging integrated-circuit (IC), the method comprising:
resetting a floating diffusion node within a pixel to produce a first pixel output;
generating a plurality of first digital samples of the first pixel output by comparing the first pixel output with a sequence of first voltage ramps that each span a first voltage range;
transferring photocharge to the floating diffusion node to produce a second pixel output;
generating a second digital sample of the second pixel output by comparing the second pixel output with a second voltage ramp that spans a second voltage range, the second voltage range exceeding the first voltage range; and
if a first condition is met, generating a plurality of third digital samples of the second pixel output by comparing the second pixel output with a sequence of third voltage ramps that each span a third voltage range that exceeds the first voltage range and is smaller than the second voltage range, the first condition requiring at least that the second digital sample not exceed a threshold value.

12. The method of claim 11 wherein the second digital sample is a full-range sample of the floating diffusion node.

13. The method of claim 11 further comprising generating a digital pixel value according to a difference between the second sample and an average of the plurality of first digital samples if the second digital sample exceeds the threshold value.

14. The method of claim 11 further comprising generating a digital pixel value according to a difference between an average of the plurality of third digital samples and an average of the plurality of first digital samples if the first condition is met.

15. The method of claim 11 further comprising generating, if the first condition is met, a digital pixel value according to a difference between an average of the plurality of first digital samples and an average of a plurality of digital samples that includes both the second digital sample and the plurality of third digital samples.

16. The method of claim 11,
wherein the pixel is disposed within a row of a pixel array, the row having a plurality of other pixels, and
wherein the first condition additionally requires that respective digital samples of pixel outputs from the plurality of other pixels not exceed the threshold value.

17. The method of claim 11 further comprising:
accumulating the photocharge within a photodetection element of the pixel over an exposure interval, and
wherein transferring the photocharge to the floating diffusion node comprises applying a control signal to a transfer gate of the pixel to enable conduction of the photocharge from the photodetection element to the floating diffusion node.

18. The method of claim 11 wherein the first, second and third voltage ranges each span from a first reference voltage to respective first, second and third maximum ramp voltages, the second maximum ramp voltage exceeds the first and third maximum ramp voltages.

19. The method of claim 11 wherein the sequence of first voltage ramps comprises successive voltage ramps that span the first voltage range with alternating slope polarity.

20. The method of claim 19 wherein the sequence of third voltage ramps comprises successive voltage ramps that span the third voltage range with alternating slope polarity.

21. An imaging integrated-circuit (IC), comprising:
a pixel having a photodetection element, floating diffusion node and output circuitry coupled to the floating diffusion node; and
means for:
resetting the floating diffusion node to generate, via the output circuitry, a first pixel output;
generating a plurality of first digital samples of the first pixel output by comparing the first pixel output with a sequence of first voltage ramps that each span a first voltage range;
transferring photocharge from the photodetection element to the floating diffusion node to generate, via the output circuitry, a second pixel output;
generating a second digital sample of the second pixel output by comparing the second pixel output with a second voltage ramp that spans a second voltage range, the second voltage range exceeding the first voltage range; and
if a first condition is met, generating a plurality of third digital samples of the second pixel output by comparing the second pixel output with a sequence of third voltage ramps that each span a third voltage range that exceeds the first voltage range and is smaller than the second voltage range, the first condition requiring at least that the second digital sample not exceed a threshold value.

* * * * *